US006124803A

United States Patent [19]
Hamma

[11] Patent Number: 6,124,803
[45] **Date of Patent: *Sep. 26, 2000**

[54] MONITORING DEVICE AT A TEXTILE MACHINE

[75] Inventor: Gerhard Hamma, Spaichingen, Germany

[73] Assignee: SIPRA Patententwicklungs- und Beteiligungsgesellschaft mbH, Albstadt, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/734,670

[22] Filed: Oct. 18, 1996

Related U.S. Application Data

[63] Continuation of application No. 08/155,472, Nov. 19, 1993, abandoned.

[30] Foreign Application Priority Data

Dec. 3, 1992 [DE] Germany ........................... 42 40 628

[51] Int. Cl.$^{7}$ ........................................ H04Q 1/00
[52] U.S. Cl. ........................ 340/825.52; 700/95
[58] Field of Search .................... 340/825.34, 825.35, 340/825.54, 825.06, 825.17, 825.52; 364/468, 478, 470; 700/95, 213, 139

[56] References Cited

U.S. PATENT DOCUMENTS

| | | | |
|---|---|---|---|
| 4,251,858 | 2/1981 | Cambigue | 340/825.17 |
| 4,310,835 | 1/1982 | Sefton | 340/533 |
| 4,574,353 | 3/1986 | Hellström et al. | 364/470 |
| 4,612,534 | 9/1986 | Büehler et al. | 340/825.54 |
| 4,663,625 | 5/1987 | Yewen | 340/825.54 |
| 4,807,140 | 2/1989 | Saulnier | 340/825.54 |
| 4,835,699 | 5/1989 | Mallard | 340/825.06 |
| 5,012,236 | 4/1991 | Troyk et al. . | |
| 5,055,659 | 10/1991 | Hendrick et al. | 340/825.54 |
| 5,084,699 | 1/1992 | DeMichele . | |
| 5,095,309 | 3/1992 | Troyk et al. . | |

FOREIGN PATENT DOCUMENTS

| | | |
|---|---|---|
| 0078550 | 5/1983 | European Pat. Off. . |
| 0142436 | 5/1985 | European Pat. Off. . |
| 2626080 | 7/1989 | France . |
| 1585415 | 7/1970 | Germany . |
| 2215582 | 10/1973 | Germany . |
| 2544530 | 12/1976 | Germany . |
| 3138472 | 12/1983 | Germany . |
| 3345168 | 6/1984 | Germany . |
| 3501944 | 7/1986 | Germany . |
| 3906508 | 9/1989 | Germany . |
| 3928831 | 3/1991 | Germany . |
| 4105450 | 8/1992 | Germany . |
| 8704900 | 8/1987 | WIPO . |

*Primary Examiner*—Brian Zimmerman
*Attorney, Agent, or Firm*—Michael J. Striker

[57] ABSTRACT

The invention is directed to a monitoring device at textile machines which have at least two stations (1$a$, 1$b$ . . . 1$n$) which generate electrical status signals in the event of the occurrence of preselected states. According to the invention, storages ($IC_1$ . . . $IC_n$) associated individually with the stations generate status signals which are encoded with an identification code in such a way that an evaluation of the status signals in an interrogating and evaluating unit (8) can determine the station which generated the status signal (FIG. 1).

25 Claims, 7 Drawing Sheets

MONITORING DEVICE AT A TEXTILE MACHINE

This is a continuation of application Ser. No. 08/155,472 filed on Nov. 19, 1993, now abandoned.

The invention is directed to a monitoring device for a textile machine having at least two stations which generate electrical status signals when preselected states occur, comprising an evaluating unit which receives the status signals and identifies the station generating the status signal.

The overwhelming majority of monitoring devices used in textile machine technology have a mechanical or electrical switch at each one of a plurality of stations, which switch is normally closed or open. When a preselected state occurs, usually an error, the switch is closed or opened (DE-AS 22 15 582, DE-AS 25 44 530, DE 31 38 472 C2). This causes a circuit having an indicator light to close and, accordingly, causes the indicator light at least to light up. In most cases, a switch-off signal for the textile machinery is also generated at the same time. Examples of preselected states are thread breakage, needle breakage or the like. The various stations can be connected in series or in parallel.

Monitoring devices of this type can be produced economically and have no difficulty in fulfilling their purpose of switching off the machinery. However, problems result with respect to the indicator if the light bulb of the indicator light is no longer functioning. In this case, particularly when the monitoring device is one capable of monitoring different error sources and there is a large number of different stations, the operator must carry out involved and time-consuming tasks to find the error which caused the machinery to stop. Moreover, monitoring devices of this type are not able to detect the operational data of the monitored machinery automatically as they only indicate stoppage of machinery due to an error. The actual cause of the error can neither be detected nor recorded, since all of the stations, regardless of the machine state monitored by them, are connected to the same transmission line and the machines are therefore stopped regardless of the type of error. Of course, it would be possible to simplify the error-finding by providing a plurality of transmission lines, each being allocated only to a portion of the stations, but this would greatly increase expenditure on construction.

The operational data can be detected simultaneously by using another known monitoring device (DE 33 45 168 A1) having a multiplexer which is connected to the existing stations and to a microprocessor and is capable of periodically scanning the existing stations. However, this also requires a comparatively large expenditure on construction, since a special transmission line is required for each station. For example, in a high-system [Translator's Note: The word "hochsystemig" used in the original German text is non-standard German] circular knitting machine with a large number of thread guides, each having two stations (e.g. for thread breakage and thread tension), up to 300 transmission lines would have to be installed within the machine frame. This is out of the question in view of the cost. A similarly expensive installation of electric lines is required when the stations to be monitored are applied in an automatic, computer-supported quality management (e.g. DE 39 06 508 A1) or if every station were provided with an address and periodically scanned via a bus system (DE 41 05 450 A1).

In a known monitoring device of the generic type mentioned above (DE 41 05 450 A1), expenditure on transmission lines is considerably reduced in that the different stations are connected serially in the manner of a shift register and a data signal is shifted through all stations one after the other by means of clock pulses. When there is no error, there is no reaction. However, when a preselected state, e.g. an error, occurs in any one of the stations, the data signal causes an error message via an AND operation. The clock pulses are simultaneously counted by a counter so that when an error message appears the counter state which has been reached indicates the station in which the data signal is located at that time, i.e. the station causing the error message to be generated Even though such a monitoring device requires only two additional control lines in addition to the two lines for the power supply, the expenditure on construction is still comparatively high as a whole, since numerous electronic components are required in each station. Further, the monitoring device is not sufficiently free of defects as interference pulses can lead to erroneous counts in the counter which hinders detection of the station from which the error message proceeds and leads to completely false results when the operational data is detected automatically.

The described problems which can occur when using the known monitoring device have the same result when the monitoring device is used alternatively or additionally for indicating, on a display or the like, the current machine status in its entirety, i.e. for providing information concerning the status of certain components, e.g. thread guides, pull-off mechanism, illumination, etc., the operator responsible for handling the machine in question or the work shift. For these reasons, monitoring devices of the generic type described above are presently used virtually exclusively for monitoring errors.

In contrast, the present invention has the object of developing the monitoring device of the generic type described above in such a way that it is also suitable for a number of monitoring tasks other than error monitoring.

A further object is to provide a monitoring device as specified above which enables a definite indentification of the station generating the status signal and which only requires one or two transmission lines if desired.

Yet another object is to provide the monitoring device such that it operates more reliably.

These and other objects are met by a monitoring device wherein each station has a storage in which is stored an identification code assigned to it in a fixed manner so that the status signal generated by it is encoded with the identification code associated with this station, and wherein the evaluating unit has means for detecting the identification code.

The invention is explained in more detail in the following in connection with the accompanying drawing with reference to embodiment examples.

Figure 1:
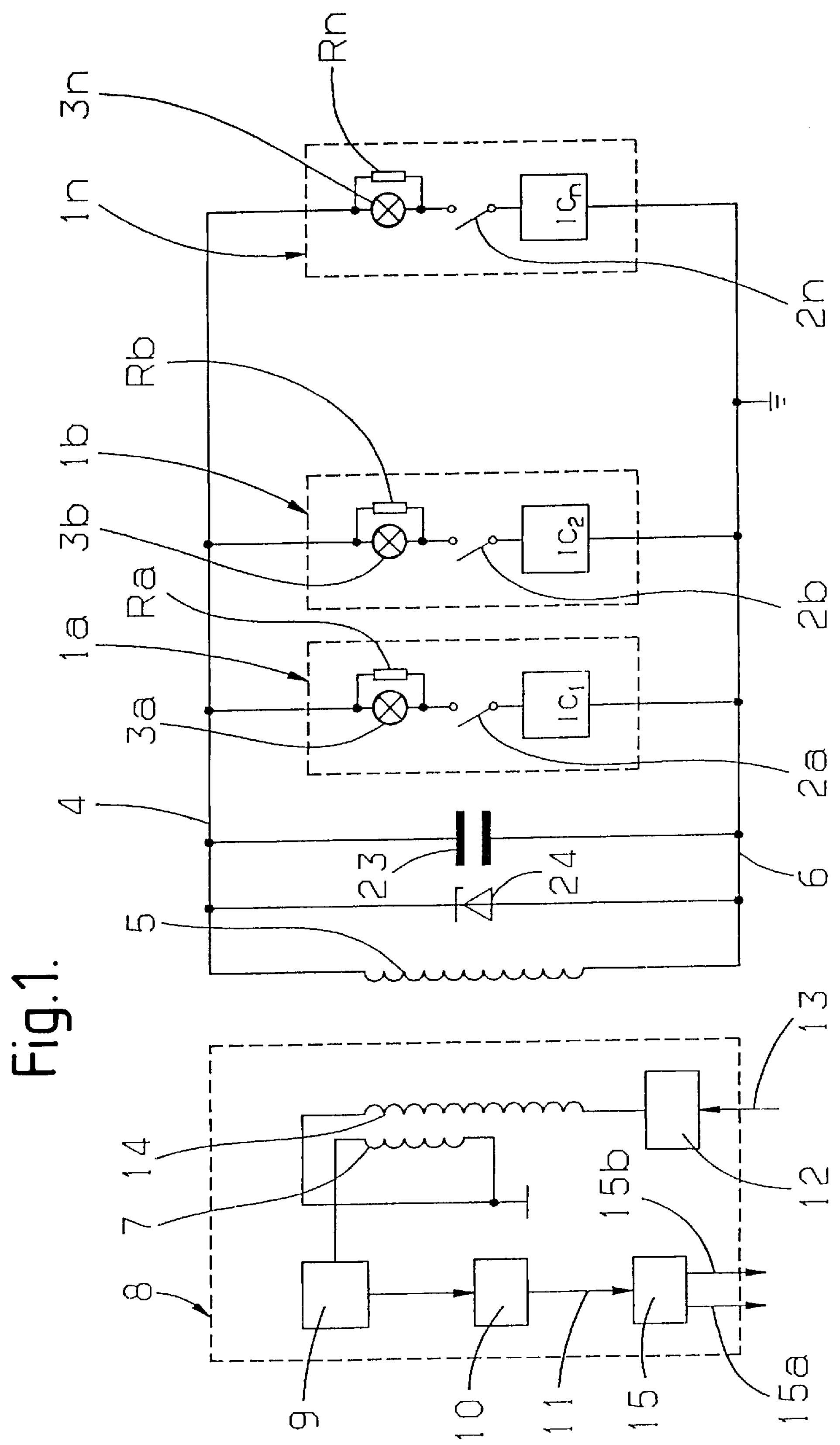
FIG. 1 shows a schematic block diagram of a first embodiment form of the monitoring device according to the invention.

The conventional parts of a monitoring device of the type in question are indicated in the right-hand portion of FIG. 1. The monitoring device contains at least two, but generally more than two stations 1*a*, 1*b* . . . 1*n*. These stations may be thread monitors which, for example, stop a knitting or weaving machine when a thread which is fed to the machine breaks or has insufficient or excess tension (e.g. DE-AS 15 85 415). Alternatively or additionally, the stations can have needle monitors which determine needle breakage or the like (DE-AS 22 15 582). Aside from these, there are numerous other states in textile machine technology which can be continuously monitored and may therefore be assigned to one of the stations under discussion. Such monitoring is known in general to the person skilled in the art and therefore need not be explained in more detail. This also applies to the sensors used for the monitoring.

As a rule, the textile machine is switched off by an electrical contact which acts like a switch 2*a*, 2*b* . . . 2*n* which is closed when a thread breaks or has excess tension, or the like. When each switch 2*a*, 2*b* . . . 2*n* is connected, via an indicator light 3*a*, 3*b* . . . 3*n*, to a line 4 which is connected with a power source on one side and grounded on the other side, the associated indicator light 3*a* . . . 3*n* lights up when one of the switches 2*a* . . . 2*n* is closed. To ensure that the device is still functioning when one of the indicator lights 3*a* . . . 3*n* is defective, the latter are advisably connected in parallel with resistors R*a* . . . R*n*. A relay or the like which is connected into the line 4 and responds when one of the switches 2*a* . . . 2*n* is closed is provided for turning off the machine. Therefore, such a monitoring device is not already equipped to identify the station 1*a* . . . 1*n* whose switch 2*a* . . . 2*n* has been closed.

To this extent, the monitoring device according to the invention is constructed in an identical manner. However, in addition, an integrated circuit $IC_1$, $IC_2$ . . . $IC_n$ is connected in series with each switch 2*a* . . . 2*n* and has a memory in which is stored an identification code associated with the respective station 1*a* . . . 1*n*. Further, the line 4 forms a transmission line. For this purpose, it is connected to one connection of a coupling coil 5 whose other connection is grounded or to a second grounded line 6 connected with the connections of the series connections formed by the switches 2*a* . . . 2*n* and the integrated circuits $IC_1$ . . . $IC_n$, which latter connections are not connected to the line 4. All these series connections are therefore connected in parallel with one another and with the coupling coil 5.

The coupling coil 5 is inductively coupled with a receiving coil 7 of an interrogating and evaluating unit 8 (FIG. 1). The latter has a receiving device 9, which is connected with the receiving coil 7, and a processing circuit 10 which picks up the output signals of the receiving device 9. When an error or the like occurs at its output 11, the processing circuit 10 transmits a signal which is characteristic of that monitoring station 1*a* . . . 1*n* in which the error occurred. According to the invention, the arrangement is effected in such a way that the status signal transmitted by any station 1*a* . . . 1*n* is always encoded in accordance with the identification code stored in the integrated circuit $IC_1$ . . . $IC_n$ in question and is preferably an encoded AC-voltage signal. The receiving device 9 serves to process signals supplied by the receiving coil 7. For this purpose, it has the necessary filters, square-wave voltage generators, demodulators or the like, while the processing circuit 10 finally transmits a serially encoded signal which corresponds to the identification code or is associated with the latter in such a way that it can serve for definite identification of the station 1*a* . . . 1*n* transmitting the status signal and comprises e.g. consecutive binary "0" and "1" information.

A recognition logic 15 with two outputs 15*a* and 15*b* is connected to the output 11. The serially encoded signal appears at the output 15*a* as it does at output 11, while either logical "0" information or logical "1" information appears at the output 15*b*. The "0" information means that the recognition logic has recognized nothing, which is interpreted to signify that all switches 2*a* . . . 2*n* are open. On the other hand, if the recognition logic recognizes a signal corresponding to a signal which would occur if one of the switches 2*a* . . . 2*n* were closed, "1" information appears at the output 15*b*, meaning "correct reading" or "identification code recognized". This "1" signal can be utilized for a switching process and used for example to actuate a relay constructed as an opener which switches off the machine.

On the other hand, the signal at output 15*a* can be fed in a conventional manner to a display which indicates for the benefit of the operator, e.g. alphanumerically, the station 1*a* . . . 1*n* from which the status signal originates so that it is possible, for example, to eliminate an error immediately, regardless of whether or not the indicator light is operable. Moreover, the signal at output 11 or output 15*a* can be fed to a recognition device for the operational data in which e.g. a protocol on the operation of the textile machinery to be monitored by the operator is processed. 1*n* contrast to the prior art, this protocol can indicate not only the number of errors or machine stops in a simple manner, but can also indicate the error sources. 1*n* the case of a circular knitting machine, this would mean that the knitting system in which an error occurs and the time it occurred can be indicated exactly.

The power supply required for operating the integrated circuit $IC_1$ . . . $IC_n$ must be guaranteed in every station 1*a* . . . 1*n* so that each station 1*a* . . . 1*n* transmits a status signal encoded in its individual identification code. A power line, for example, which leads to all stations could be provided for this purpose. Further, it would be possible in this case, in a manner analogous to conventional monitoring devices, to omit the coupling coil 5 and replace it with an evaluating circuit which directly provides for the desired identification and possibly also for switching off the machine and for the illuminated displays.

However, it is believed that the monitoring device shown in FIG. 1 represents the best solution at this time as it requires only slight changes in the construction of the machine, facilitates subsequent installation in existing machinery, and can be composed of components which are already used for other purposes and are therefore available at low cost. The monitoring device according to the invention can accordingly be offered at such a low price that it has no appreciable influence as a whole on the cost of textile machine operation, e.g. weaving or knitting, in spite of the considerable advantages which it provides.

In contrast to the prior art, the stations 1*a* . . . 1*n* in the preferred monitoring device shown in FIG. 1 have passive circuits which are not connected with any batteries or the like and are not suitable in themselves for transmitting status signals. Rather, these circuits are activated instead by means 12 for transmitting an interrogating signal, e.g. an oscillator whose input 13 can be connected to a power source and whose output is grounded via a transmitting coil 14. The interrogating signal, e.g. a sine voltage with a frequency of 100 to 150 KHz, then induces an alternating current in the coupling coil 5 which is transformed by a rectifier contained in the integrated circuits $IC_1$ . . . $IC_n$ into DC voltage which is used for operating the integrated circuits $IC_1$ . . . $IC_n$ and to generate the status signals encoded with the identification code when the switches 2*a* . . . 2*n* are closed. At the same time, the generated DC voltage serves to supply the indicator light 3*a* . . . 3*n* in question with the required current when the switches 2*a* . . . 2*n* are closed.

The individual stations 1*a* . . . 1*n* and their integrated circuits $IC_1$ . . . $IC_n$ are advisably constructed as so-called transponders or responding devices which are known in general for other uses and, for example, are implanted in animals to facilitate their identification (see U.S. Pat. No. 5,012,236, U.S. Pat. No. 5,084,699 and U.S. Pat. No.

5,095,309 and WO 87/04900, for example). Since the construction and manner of operation of such transponders are known in general, the references mentioned above are referred to so as to prevent repetition with regard to the subject matter of the present disclosure and to obviate further explanations. The details discussed in the following therefore serve only to facilitate understanding of the monitoring device according to the invention.

Conventional transponders are generally accommodated in very small chips which are installed in objects or implanted in living creatures which are moved or at least movable and do not naturally possess their own power supply. To detect the identification code it is therefore necessary to bring the coupling coils 5 as close as possible to the receiving coils and transmitting coils 7 and 14, respectively, which are customarily combined in a transmitting and receiving coil unit, but can also have a single coil (WO 87/04900). In the subject matter of the present application, however, a relative movement between the transmitting and receiving coil unit and the coupling coils is generally not required so that it is possible to arrange them so as to be stationary and in a fixed spatial allocation relative to one another so as to achieve the desired inductive coupling when activating the integrated circuits $IC_1 \ldots IC_n$ and when receiving the encoded error signals. In particular to economize on costs, it is also possible, alternatively, to accommodate the interrogating and evaluating unit 8 in a conventional hand-held reader as is known e.g. for scanning bar codes. In this case, the coupling coil 5 of each individual textile machine would have to be arranged at an easily accessible location for the hand-held reader and the status report would have to be combined with an easily recognizable optical and/or acoustic signal so that the operator is directed to the machine to which the hand-held reader is to be applied for recognizing or detecting a state.

The transponders currently believed to be the best for the purposes of the invention were developed by the firm of Trovan Limited, Isle of Man, Great Britain, and are produced in Germany by the firm of AEA, Frankfurt/Main and sold e.g. as model numbers ID 100, ID 200/300 or LID 500 (compare in particular U.S. Pat. No. 5,095,309). The frequency of the interrogating signal in these transponders is e.g. 134 KHz. The interrogating signal is rectified in the transponder to obtain the required operating voltages and is used for generating a clock signal for reading a storage matrix. The binary identification code stored in this storage matrix has 40 digits, for example, so that an enormous number of different codes can be achieved. With the help of these codes, a signal which is modulated by phase shift keying (PSK) and can easily be distinguished from the interrogating signal is generated and is converted in the receiving device 9 into a binary signal which is processed with a phase detector before being transmitted to the processing circuit 10 for further processing. Alternatively, the encoding can also be realized by frequency shift keying (FSK, see WO 87/04900), amplitude modulation or optionally in some other way.

In the transponders described above, the switches 2$a$ . . . 2$n$ indicated in FIG. 1 are preferably arranged between the integrated circuit $IC_1 \ldots IC_n$ in question and the coupling coil 5 in such a way that the interrogating signal transmitted by the latter when the switch is open is completely decoupled from the respective integrated circuit $IC_1 \ldots IC_n$ and therefore generates neither operating voltage nor clock signals. Rather, the operating voltage and clock signals are only generated when one of the switches 2$a$ . . . 2$n$ changes to the closed state due to the occurrence of an error or the like so that only the integrated circuit $IC_1 \ldots IC_n$ associated with the latter directly in the series connection can cause the retransmission of a status signal. Alternatively, it is also possible to arrange the switches 2$a$ . . . 2$n$ in such a way that the operating voltage for the integrated circuits $IC_1 \ldots IC_n$ is permanently generated so as to maintain the latter in ready state, but the interrogation of one of the storages is only effected when the respective switch 2$a$ . . . 2$n$ is closed.

Figure 2:
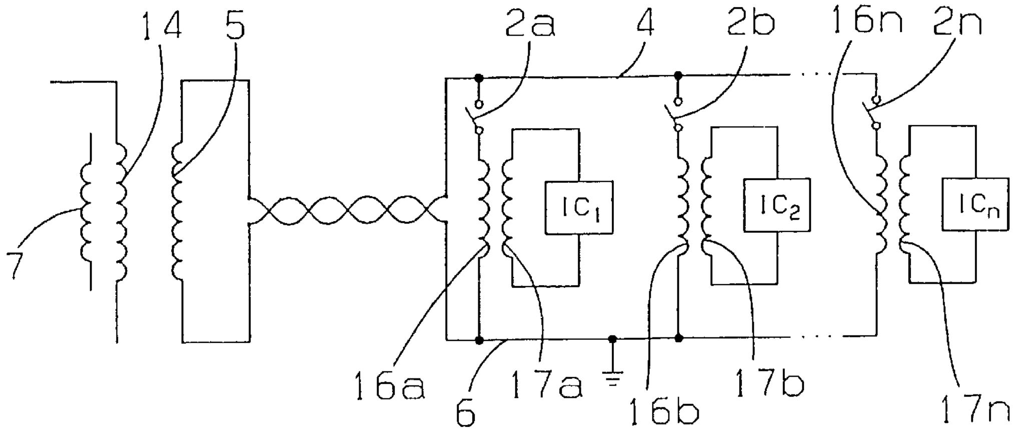
FIGS. 2 to 8 show schematic block diagrams of other embodiment forms of the monitoring device according to the invention.

In the embodiment form according to FIG. 2, identical parts are provided with the same reference numbers. In contrast to FIG. 1, the switches 2$a$, 2$b$ . . . 2$n$, each with a first coil 16$a$ . . . 16$n$, form a series circuit in each instance which is connected with the line 4 on one side and with the ground line 6 on the other side. However, the integrated circuits $IC_1 \ldots IC_n$ are connected in parallel with a second coil 17$a$ . . . 17$n$ which is inductively coupled with an associated first coil 16$a$ . . . 16$n$. Accordingly, an additionally improved decoupling of the integrated circuits $IC_1 \ldots IC_n$ from the rest of the circuit parts is achieved. As in FIG. 1, it is not possible for a status signal to be retransmitted to the receiving coil 7 when the switches 2$a$ . . . 2$n$ are opened. When one of the switches 2$a$ . . . 2$n$ is closed, the interrogating signal transmitted via the transmitting coil 14 and the coupling coil 5 is also directed through the associated first coil 16$a$ . . . 16$n$ and is transmitted inductively from the latter to the second coil 17$a$ . . . 17$n$ coupled with it so that the storage containing the identification code is interrogated in the integrated circuit $IC_1 \ldots IC_n$ connected with the second coil 17$a$ . . . 17$n$ and the generated status signal is transmitted to the receiving coil 7 via the coils 17$a$ . . . 17$n$, 16$a$ . . . 16$n$, respectively, the transmission line 4, and the coupling coil 5.

Figure 3:
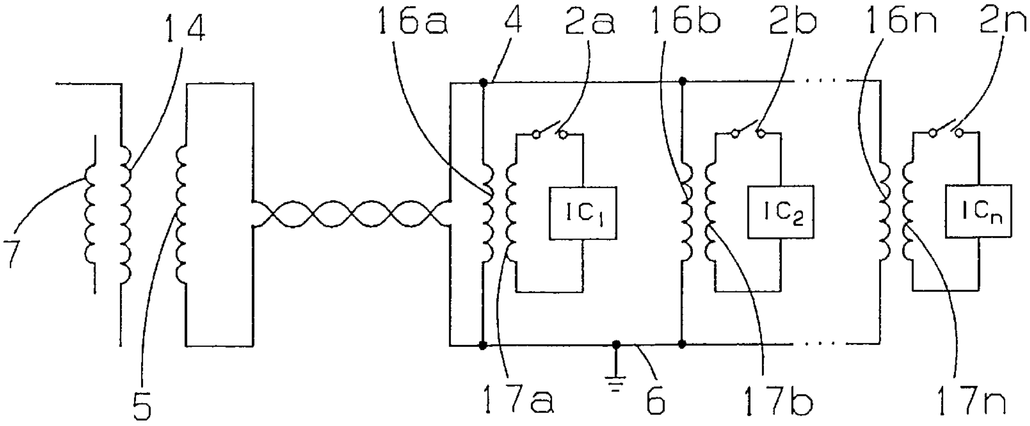

In FIG. 3, parts identical to those shown in FIG. 1 are provided with the same reference numbers. However, in contrast to FIG. 2, the switches 2$a$ . . . 2$n$ are not connected in series with the first coils 16$a$ . . . 16$n$, but are connected additionally in the circuits having the second coils 17$a$ . . . 17$n$ and the integrated circuits $IC_1 \ldots IC_n$. Similar to FIG. 2, the transmission of a status signal to the receiving coil 7 is effected when a switch 2$a$ . . . 2$n$ is closed.

Figure 4:
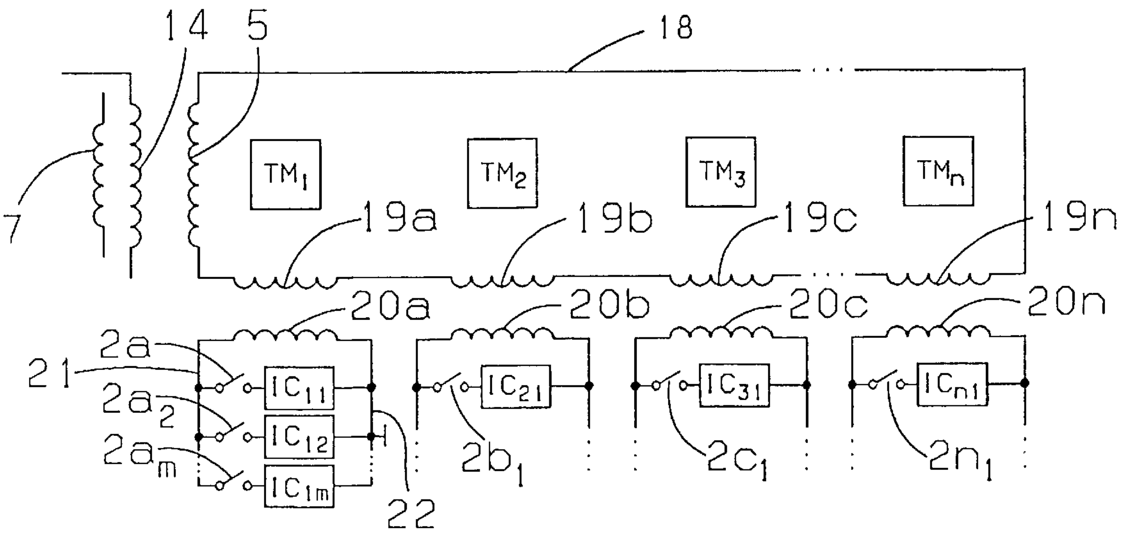

In FIG. 4, in which parts identical to those in FIG. 1 have the same reference numbers, the coupling coil 5 is connected in a line 18 acting as a transmission line and in which, in addition, a number of first coils 19$a$ . . . 19$n$ are connected. As is shown only schematically in FIG. 4, each of these first coils 19$a$ . . . 19$n$ is associated with a specific textile machine $TM_1 \ldots TM_n$ and inductively coupled with a second coil 20$a$ . . . 20$n$. This second coil 20$a$ . . . 20$n$ corresponds, for example, to the coupling coil 5 in FIG. 1 and is connected to a line 21 acting as transmission line and to a grounded line 22, an optional number of series connections including integrated circuits $IC_{11} \ldots IC_{m1}$, $IC_{21}$, $IC_{31} \ldots IC_{n1}$ and switches 2$a$. . . 2$a_m$, 2$b_1$, 2$c_1$ . . . 2$n_1$ being connected between the latter. Accordingly, in contrast to FIG. 1, each of the second coils 20$a$ . . . 20$n$ acting as coupling coil is connected in parallel with as many switches 2$a_1$ . . . 2$n_1$ is there are stations per textile machine $TM_1 \ldots TM_n$. However, since all integrated circuits $IC_{11} \ldots IC_{n1}$ can be provided with a different identification code in a simple manner, it would also be possible in the case of FIG. 4 to allocate only one of the coils 20$a$ . . . 20$n$ to them and to program the interrogating and evaluating unit 8 in such a way that, in addition to the usual status signal, there is also a display or the like of those textile machines $TM_1 \ldots TM_n$ from which the error signal proceeded.

Figure 5:
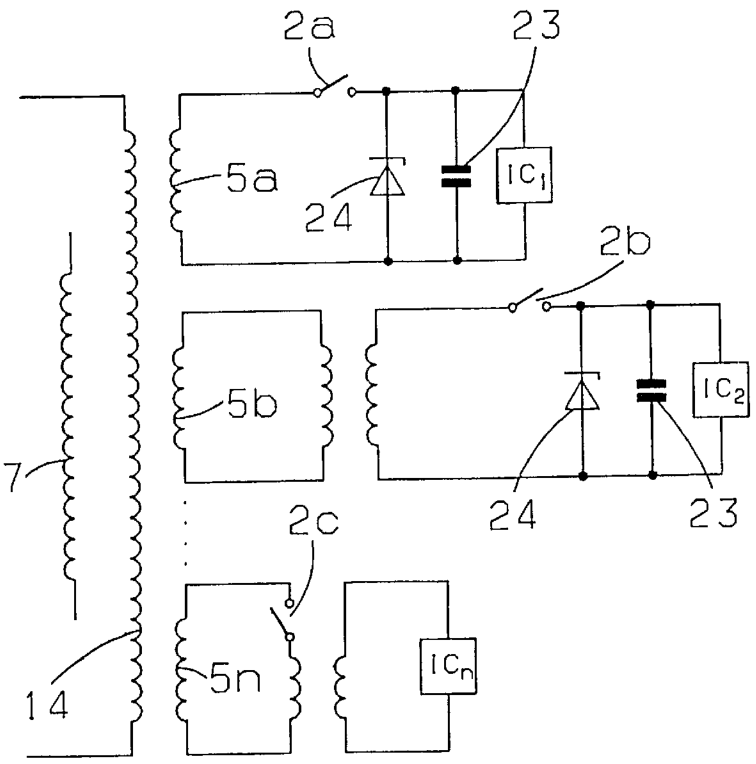

Finally, FIG. 5 shows an embodiment form having a plurality of coupling coils 5$a$, 5$b$ . . . 5$n$, all of which are inductively coupled with an individual transmitting and receiving arrangement 7, 14. Each of these coupling coils 5a . . . 5n can then be connected with at least one switch 2a . . . 2n and an associated integrated circuit $IC_1$ . . . $IC_n$ in a manner analogous to FIG. 1 (compare coupling coil 5) or to FIG. 3 (compare coupling coil 5b) or similar to another of the described embodiment forms. In this way, a complete decoupling is achieved and a plurality of coupling coils 5a . . . 5n which are decoupled from one another can be controlled with an individual transmitting coil 14. Similarly, a plurality of separate receiving coils 7 could be provided.

FIGS. 1 and 5 also show that a capacitor 23 and a zener diode 24 can be connected in parallel to each of the integrated circuits $IC_1$ . . . $IC_n$. The zener diode 24 serves to protect the integrated circuits $IC_1$ . . . $IC_n$ from operating voltage higher than the allowable operating voltage. The capacitor 23 also offers protection against overvoltage in that it reverses charge when needed.

Figure 6:
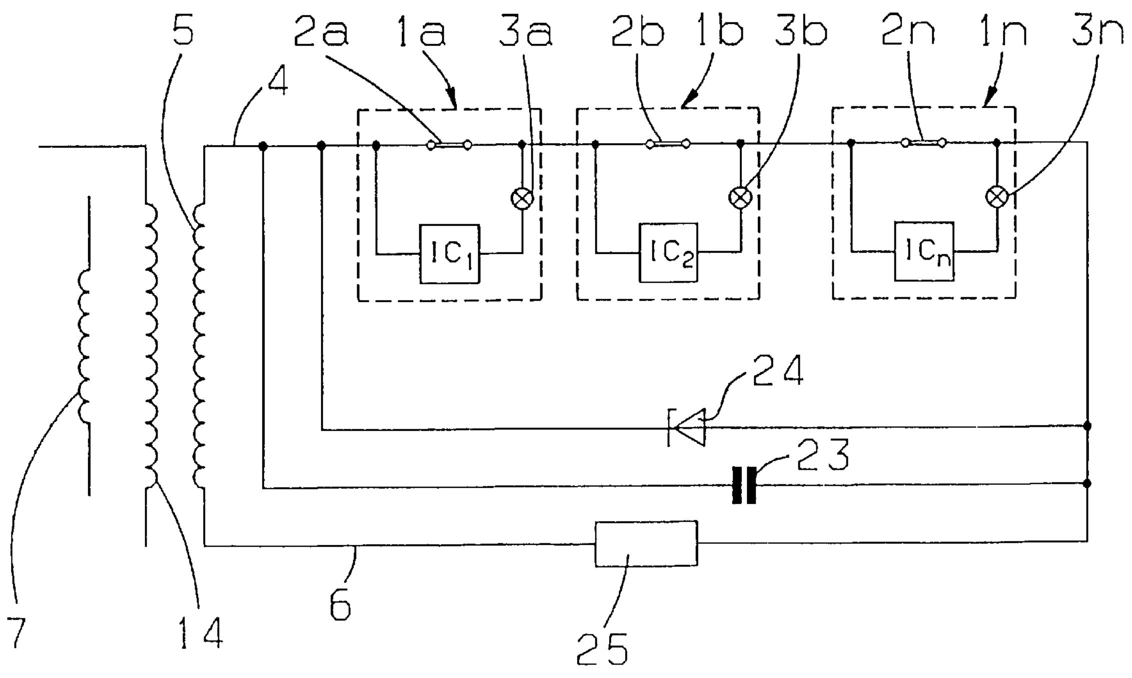

FIG. 6 shows another embodiment form of the invention in which parts identical to those in FIG. 1 are provided with the same reference numbers. In contrast to FIG. 1, the switches 2a . . . 2n connected in series in the line 4 are normally closed rather than opened. A circuit having an integrated circuit $IC_1$ . . . $IC_n$ and an indicator light 3a . . . 3n which is connected in series with the latter and can be connected in parallel with a resistor Ra . . . Rn (FIG. 1), not shown here, is connected in parallel with each switch 2a . . . 2n. Moreover, a resistor 25 which prevents shortcircuiting of the coupling coil 5 is connected in the line 6 which is not grounded. In this embodiment form, e.g. in the event that the switch 2a is opened, the current in the circuit 4, 5, 6 passes through the respective integrated circuit $IC_1$ so that the indicator light 3a is switched on and a status signal is transmitted via the coupling coil 5. The status signal is encoded in accordance with the storage contents of the integrated circuit $IC_1$ and indicates that the switch 2a is in the opened state. This same operation is effected when one of the other switches 2a . . . 2n is opened. As long as the switches 2a . . . 2n are closed, the respective integrated circuits $IC_1$ . . . $IC_n$ have no current so that no status signals are transmitted. Switches of this type are used e.g. in needle monitors. They have the advantage that the circuit 4, 5, 6 is open after a station 1a . . . 1b is removed and the textile machine can therefore not be started by mistake before the station has been reinstalled.

Figure 7:
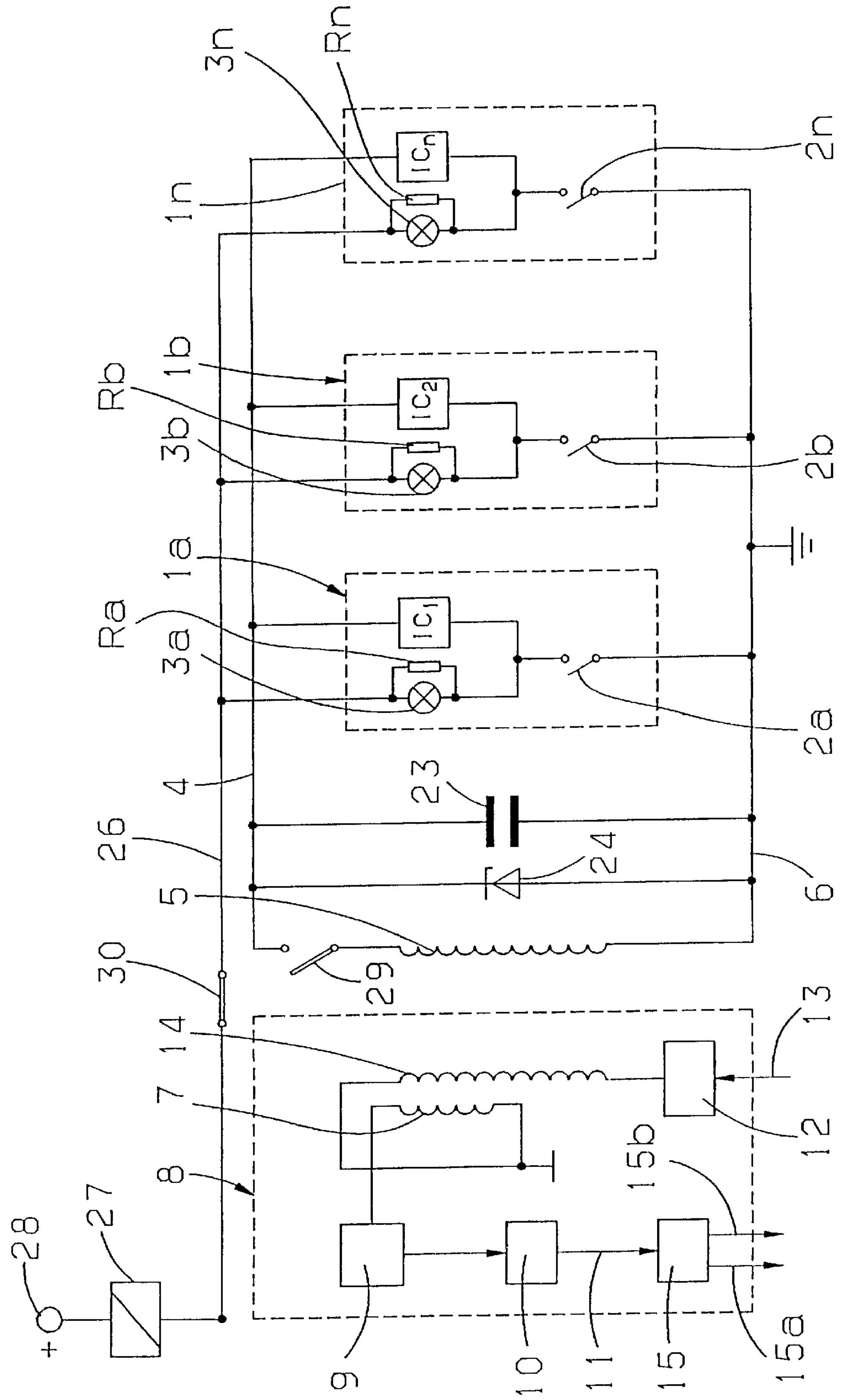

In the embodiment examples described above, not only the interrogating and status signals, but also the power required for supplying the indicator lights 3a . . . 3n and possibly a cut-off relay were transmitted via the coils 5, 7 and 14. FIG. 7, in which identical parts are also provided with the same reference numbers, shows a circuit arrangement in which this is not necessary. As shown in FIG. 7, the circuits formed by the serially connected switches 2a . . . 2n and integrated circuits $IC_1$ . . . $IC_n$ are connected between the lines 4 and 6 resulting, to this extent, in the same conditions as in FIG. 1. On the other hand, although the indicator lights 3a . . . 3n are likewise connected in series with the switches 2a . . . 2n, they are connected to another line 26 leading via a relay 27 or the like to the positive pole of a power source 28. It can be seen that when one of the switches 2a . . . 2n is closed the respective indicator light 3a . . . 3n is supplied with power via the power source 28 and the relay 27 can simultaneously cause the machine to stop, while the respective integrated circuit $IC_1$ . . . $IC_n$ transmits its status signal to the receiving coil 7 via the coupling coil 5. The interrogating circuit is accordingly completely separated from the cut-off circuit. Three lines 4, 6 and 26 are required instead of two lines 4 and 6, which is still economical.

To prevent the DC current supplied by the power source 28 from impairing the normal functioning of the integrated circuits $IC_1$ . . . $IC_n$ or destroying them, the monitoring device according to FIG. 7 should be provided, in addition, with devices, not shown in FIG. 7, which are known to the person skilled in the art and work automatically. Alternatively, it would also be possible to provide each of the lines 4 and 26 with a switch 29 and 30, respectively. The switch 29 in line 4 is normally open, whereas the switch 30 in line 26 is normally closed. The circuit described above causes the textile machine to stop via the relay 27 when one of the switches 2a . . . 2n is closed. If the operator subsequently briefly opens the switch 30 and closes the switch 29 an error message is transmitted via the coupling coil 5 to the receiving coil 7 without being impaired by the DC current coming from the power source 28. After the error is corrected, the conditions prevailing in FIG. 7 are restored. To prevent erroneous switching, the switches 29 and 30 can be constructed as push buttons which are pretensioned in the position shown in FIG. 7 by springs. Alternatively, it is possible to actuate the switches 29, 30 automatically, e.g. to reverse them for several seconds after a machine stoppage is caused by a switch 2a . . . 2n and then to return them to the position shown in FIG. 7.

Figure 8:
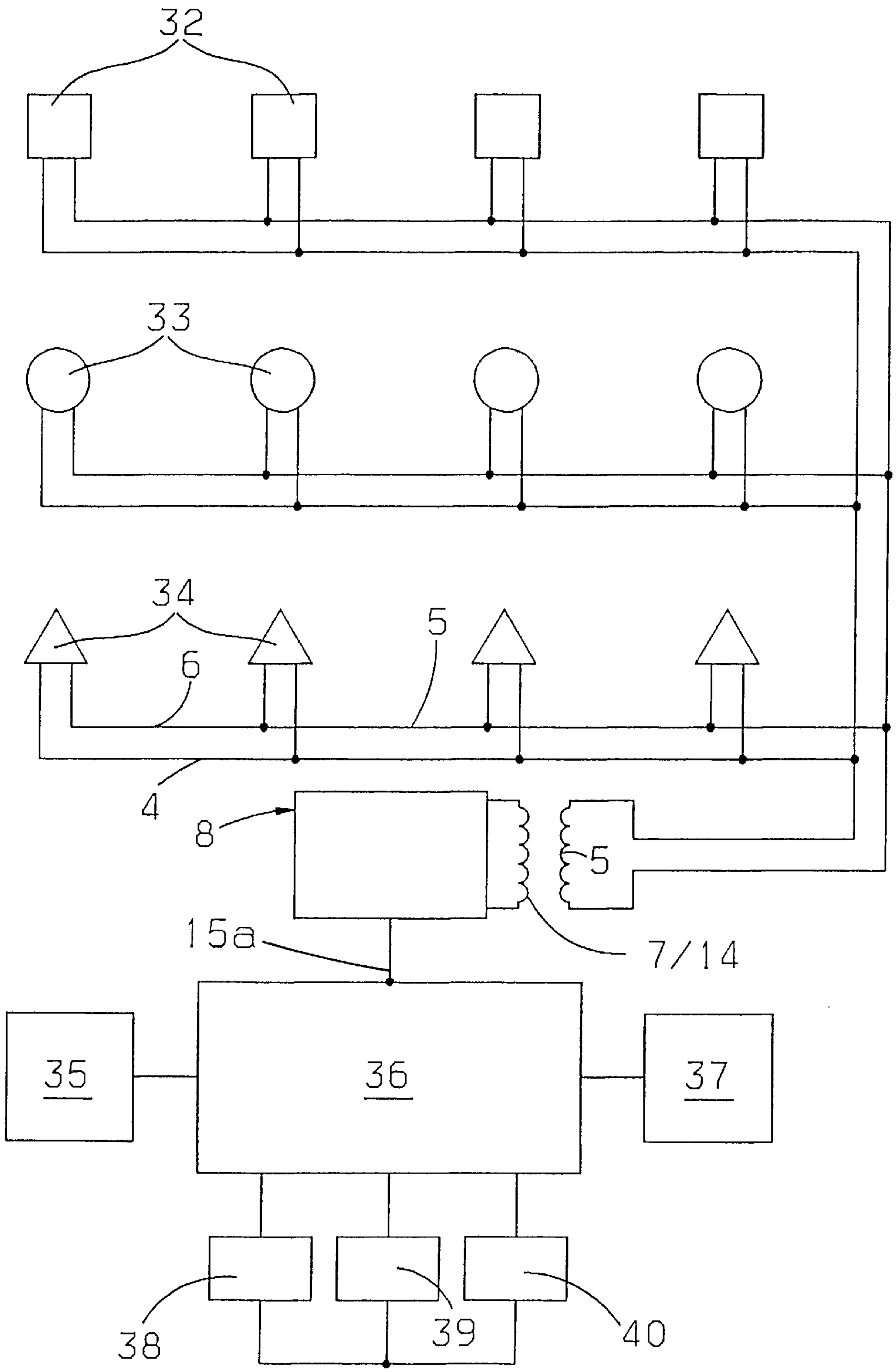

FIG. 8 shows that the monitoring device according to the invention can also be used for other tasks rather than simply for monitoring errors. The square, round and triangular blocks indicate stations 32, 33 and 34, respectively, which can have different functions.

For example, stations 32 are stations corresponding to the stations 1a . . . 1n in FIG. 1 which serve to monitor errors and, for example, contain switches which change state when a preselected error, e.g. thread or needle breakage, occurs. These stations 32 can be connected with lines 4 and 6 corresponding to FIGS. 1 and 6. The line 6 can be the machine ground.

Stations 33, for example, serve to display status generally or to inform the operator that a certain action must be carried out. For example, they contain switches which are actuated when the machine illumination or the like is switched on or serve to reset devices which are set when an error or the like occurs and which must be reset before restarting the textile machine. This may also be a matter of a counter or the like which must be reset to zero when the machine is started. Further, switches can be provided which must be closed or opened when a certain work shift begins. Finally, there may be a station like that indicated in FIG. 3 by the coil 16a which is arranged at an easily accessible location on the machine. The unit formed by the coil 17a and the integrated circuit $IC_1$ can be accommodated in a code card carried by an operator so that the operator can input his identity into the textile machine before the start of the shift and by briefly inserting the code card in the vicinity of the coil 16a. Accordingly, it is possible to determine automatically the identity of the operator who worked at the machine at a given time. It is also possible to count the number of revolutions of a circular knitting machine in that a switch is closed briefly with each revolution and a corresponding status signal is generated which triggers a counting process in a counter.

Finally, the stations 34 may perform a controlling or adjusting function and have, for example, an on/off switch for the textile machine, a switch which is actuated during tip operation or when the textile machine is switched to extra-slow speed, or a device serving to adjust the pull-off force of a pull-off mechanism or to adjust the thread tension or the like.

The stations described above not only make it possible to determine all important operational data in a comprehensive, more or less automatic manner, but also to display immediately all of the important data for the momentary machine status alphanumerically on a screen 35 or the like which is connected with the interrogating and evaluating unit 8 according to FIG. 1 so that the operator can be informed at any time of the status of the machine monitored or operated by him or of the status of the function elements provided at this machine by glancing at the screen. This is particularly useful when one operator must monitor a number of machines which do not all lie within his field of vision simultaneously and is indicated in FIG. 8 in that a computer 36, e.g. in the form of a conventional personal computer to which the screen 35 and an operational data detection device 37 are connected, is connected to the output 15*a* of the interrogating and evaluating unit.

Finally, conventional control tasks can also be accomplished with the help of the monitoring device according to the invention. This is indicated in FIG. 8 by blocks 38 to 40 which are connected. to additional outputs of the computer 36. Each of these blocks 38 to 40 represents e.g. a relay, a protective arrangement or the like for a preselected control process. In the embodiment example, block 38 is associated with the drive motor of a circular knitting machine in such a way that the latter is started when a start switch within one of the stations 34 is actuated for this purpose. A brake which is activated when an associated stop switch within one of the stations 34 is actuated is associated with the block 39 in a corresponding manner. Finally, the block 40 is associated with a switch of a station 33 and serves e.g. to switch on an automatic oiler or lubricator or fluff blowing device of the circular knitting machine. Numerous other controlling, adjusting or monitoring tasks may be performed in a corresponding manner. For example, it is possible to connect an output of the computer 36 with a counter which counts the machine revolutions or the like or to carry out preselected adjustments via additional outputs of the computer 36. In this regard it is possible, for example, to provide one of the stations 34 with a push button which when actuated generates a signal which is encoded corresponding to the associated integrated circuit and is fed, via an output of the computer 36, to an actuating member which serves, for example, to adjust the pull-off force of a pull-off mechanism of a circular knitting machine. For instance, the pull-off force could be increased or decreased in stages of 5 pond, for example, by actuating the push button and the selection of the mathematical sign could be adjusted via a button on the computer.

To perform the described adjusting, monitoring and control tasks it is advisable to provide the computer 36 with a card having a correspondingly large number of programmable outputs. In so doing, the arrangement can preferably be effected in such a way that certain states (e.g. "illumination on") are maintained when actuating the main switch and need not be initiated again when restarting the machine. In every case, a special advantage consists in that only one individual line is required for connecting the interrogating and evaluating unit 8 with the various stations 32, 33 and 34 on the one hand and with the computer 36 on the other hand, since all of the signals proceeding from the stations 32 to 34 consist of serially encoded AC signals and can be transmitted as multi-digit, alphanumerical information from the interrogating and evaluating unit 8 to the computer 36 which uses this information for the intended purposes. The computer 36 therefore need only be provided with one active serial interface, e.g. corresponding to the RS 232 standard.

Figure 9:
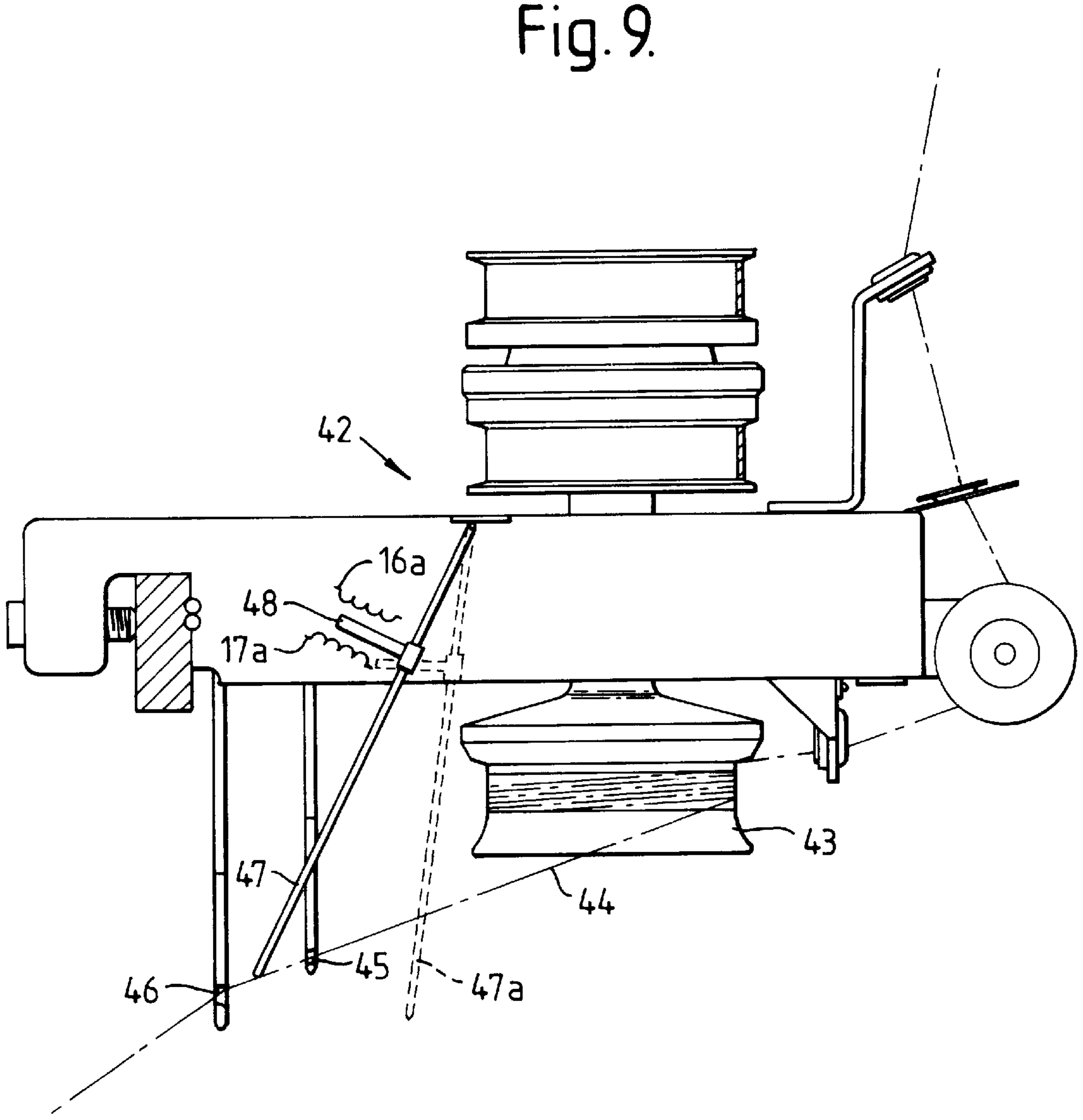
FIG. 9 shows a special construction of a station for a monitoring device according to FIGS. 2 to 4.

Instead of the switches 2*a* . . . 2*n* shown in the drawing, numerous other switches or sensors in the form of inductive or capacitative switches, optoelectronic couplers, light barriers or the like can also be provided. An embodiment example for an inductive switch is indicated in FIG. 9. This figure shows a known thread storage feeder 42 with a storage cylinder 43. A thread 44 which is to be fed, for example, to a knitting machine and drawn off from a pull-off bobbin, not shown, is wound around the storage cylinder 43 several times. At the outlet of the device 42, the thread 44 passes through two thread eyes 45 and 46 or the like, between which is arranged a clip-like feeler 47 which normally contacts the thread 44. In the event of thread breakage or appreciable slack in the thread tension, the feeler 47 falls into the position 47*a*, shown in dashed lines, due to gravity and accordingly triggers a switching process of the kind described in the preceding (DE-PS 35 01 944) which is used for turning off the knitting machine. According to the invention, the switching process is effected in that the feeler 47 is provided with a metal lug 48 which is arranged in the gap 47 between two coils, e.g. coils 16*a* and 17*a* according to FIG. 3, when the feeler contacts the thread 44. These coils are associated e.g. with a monitoring station for the device 42. In the case of a monitoring station according to FIG. 3, the switch 2*a* may be dispensed with. If the thread tension is so great that the metal lug 48 is arranged between the coils 16*a*, 17*a*, the latter cannot transmit a status signal, which corresponds to the open switch position in FIG. 3. On the other hand, if the feeler 47 falls into position 47*a* due to inadequate thread tension, the metal lug 48 is automatically moved out of the gap between the two coils 16*a*, 17*a*, which results in the transmission of a status signal with the code provided by the integrated circuit $IC_1$ and corresponds to the closed position of the switch 2*a* in FIG. 3.

The invention is not limited to the above-described embodiment examples which can be modified in many ways. Accordingly, the integrated circuits $IC_1 \ldots IC_n$ could also be replaced by circuits formed by individual switching members. In either case, programmable read-only memories (PROM, EPROM, etc.) are preferably used as storages. The transmitting and receiving coil unit can be provided with an individual coil (WO 87/04900), but is constructed in the solution believed at present to be the best (e.g. U.S. Pat. No. 5,012,236) in such a way that two receiving coils are connected in a differential circuit and arranged inside a transmitting coil in such a way that the interrogating signals generated by the latter are not noticeable in the receiving circuit. Obviously, the transmitting and receiving coil unit 5, 7 and 14 which includes coils which are inductively coupled with a coupling coil could also be replaced by some other kind of transmitting and receiving units, particularly having antennae or the like for transmitting the interrogating signals and receiving the status signals on one side and for receiving the interrogating signals and transmitting the status signals on the other side. It is also possible to use the described monitoring device for monitoring a plurality of textile machines, each of which has only one individual station 1*a* . . . 1*n*. Moreover, further processing of the received and evaluated status signals is optional to a great extent, even though the invention can be successfully used for carrying out control functions in addition to simply recognizing and displaying errors, in particular within the framework of routine detection of continuous operational data. Another particularly important monitoring function would be, for example, to monitor the various thread guides of a thread changing mechanism. Since only one thread guide is ever switched on at any one time, while all other thread guides are switched off, the possibility described above for providing each individual thread guide with its own identification code can help to determine in a simple manner whether a thread guide is currently inactive because of an error or because of a predetermined pattern and, in the latter case, to prevent an unwanted stopping of the machine. As concerns the evaluating part of the monitoring device, it may be advisable to generate the interrogating signals in the form of pulse trains and to receive the status signals in the intervals between these pulse trains and/or to process the different information in such a way that it is possible to determine in a reliable manner not only the first state to be detected, but also to distinguish between a plurality of errors or changes in status which are more or less simultaneous or which follow closely upon one another. Of course, it is also possible to provide couplings other than the described inductive couplings, in particular combined inductive/capacitative couplings for transmitting the status signals and/or the operating power, although it is also possible to transmit the operating power for the integrated circuits $IC_1 \ldots IC_n$ with other means, e.g. via the line 26 in FIG. 7. Finally, the invention can be used advantageously anywhere that determined encoded functions or information must be transmitted between components moving relative to one another as, for example, between the frog and the needle cylinder or between the frame and the pull-off mechanism in circular knitting machines or, in flat knitting machines, between the slides and the needle beds. To avoid costly conventional slip member arrangements or trailing cable arrangements it is possible to arrange the interrogating and evaluating unit 8 at a stationary part and to arrange selected stations 1*a* . . . 1*n* at a moved part. Since such devices can easily bridge distances of several millimeters, it would only be necessary to arrange the transmitting and receiving coils 7, 14 or the like and the coupling coils 5 or 5*a* . . . 5*n* associated with them in such a way that they pass sufficiently close to one another during each revolution or each lift of the relatively moving parts. In this way, a completely contactless transmission of identifiable status signals can be effected.

While the invention has been illustrated and described as embodied in a knitting or weaving machine, it is not intended to be limited to the details shown, since various modifications and structural changes may be made without departing in any way from the spirit of the present invention, particularly with respect to other textile machines. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Monitoring device for a textile machine, said monitoring device comprising at least two stations (1*n*) each having a storage in which is stored an identification code associated to it in a fixed manner and means (2*n*) for generating a first electrical status signal during normal operation of said machine or a second status signal when a preselected abnormal state occurs, said second status signal being encoded with the identification code associated with this station; a common conductor over which said status signals of said at least two stations are transmitted; an electrical circuit coupled with said means of said at least two stations in such a manner that said second status signals are automatically generated in said common conductor when said preselected abnormal state occurs and an evaluation unit associated with said common conductor for receiving the status signals appearing in said common conductor, said evaluation unit having means for detecting the identification code such that the station generating the status signal can be identified therefrom; wherein the monitoring device has only one common conductor for transmission of said status signals and only two status signals are generated by each of said means for generating.

2. Monitoring device according to claim 1, characterized in that at least one station (1*a* . . . 1*n*) has a switch (2*a* . . . 2*n*) which is normally in the opened (closed) state, changes into its closed (opened) state when a change in status occurs, and accordingly enables a status signal to be generated.

3. Monitoring device for a textile machine, said monitoring device comprising at least two stations (1*n*) each having a storage in which is stored an identification code associated to it in a fixed manner and means (2*n*) for generating during operation of said textile machine a first normal electrical status signal or a second status signal when a preselected abnormal state occurs; said second status signal being encoded with the identification code associated with this station; a common conductor over which said status signals of said at least two stations are transmitted; an electrical circuit coupled with said at least two stations in such a manner that said second status signals are automatically generated in said common conductor when said preselected abnormal state occurs; and an evaluation unit (8) being associated with said common conductor for receiving the status signals appearing in said common conductor, said evaluation unit having means for detecting the identification code such that the station generating the status signal can be identified therefrom, wherein each of said stations has a switch (2*a* . . . 2*n*) for generating said status signals and a passive circuit ($IC_1 \ldots IC_n$) connected to said switch and including one of said storages, said switches and passive circuits being part of said electrical circuit; wherein said evaluating unit (8) is constructed as an interrogating and evaluating unit and has activating means (12) for activating the passive circuits ($IC_1 \ldots IC_n$); and wherein means (5,7,14) are provided for coupling said common conductor (4) and said evaluating unit (8) in such a manner that said electrical circuit and said passive circuits are activated at the same time for transmitting said second encoded status signals whenever a preselected abnormal stated occurs; wherein the monitoring device has only one common conductor for transmission of said status signals and only two status signals are generated by each of said means for generating.

4. Monitoring device according to claim 3, characterized in that the passive circuits ($IC_1 \ldots IC_n$) have circuits constructed as transponders.

5. Monitoring device according to claim 3, characterized in that the circuits ($IC_1 \ldots IC_n$) have storages with permanent identification codes.

6. Monitoring device according to claim 3, characterized in that the switch (2*a* . . . 2*n*) of at least one station (1*a* . . . 1*n*) is connected in parallel with the common conductor (4) (FIG. 1).

7. Monitoring device according to claim 3, characterized in that the switch (2*a* . . . 2*n*) of at least one station (1*a* . . . 1*n*) is connected serially in the common conductor (4) (FIG. 6).

8. Monitoring device according to claim 3, characterized in that display elements (3*a* . . . 3*n*) are associated with the stations (1*a* . . . 1*n*) and the common conductor (4) also transmits the power required for their operation.

9. Monitoring device according to claim 3, characterized in that display elements (3*a* . . . 3*n*) are associated with the stations (1*a* . . . 1*n*) and are connected to another line (26) serving to supply them with power.

10. Monitoring device according to claim 9, characterized in that the display elements (3*a* . . . 3*n*) are connected in parallel with the passive circuits ($IC_1$ . . . $IC_n$) and the line (26) serving for the power supply has a switch (30) which is normally closed, whereas the common conductor (4) has a switch (29) which is normally open.

11. Monitoring device according to claim 3, characterized in that a computer (36) is connected to an output (15*a*) of the evaluating unit (8) to form a monitoring and control device.

12. Monitoring device according to claim 11, characterized in that the computer (36) is provided with a preselected number of programmable outputs which can be connected to switching elements (38 to 40).

13. Monitoring device according to claim 11 or 12, characterized in that the computer (36) is connected with the evaluating unit (8) by a single serial interface.

14. A textile machine, comprising a textile machine part operating in a normal operating state or in a preselected abnormal state; and a monitoring device including at least two stations each having a storage in which is stored an identification code associated to it in a fixed manner and means (2*n*) for generating a first electrical status signal during the normal operating state and a second status signal when the preselected abnormal state occurs, said second status signal being encoded with the identification code associated with this station; a common conductor over which said status signals of said at least two stations are transmitted; an electrical circuit coupled with said means of said at least two stations in such a manner that said second status signals are automatically generated in said common conductor when said preselected abnormal state occurs; and an evaluation unit associated with said common conductor for receiving the status signals appearing in said common conductor, said evaluation unit having means for detecting the identification code such that the station generating the status signal can be identified therefrom; wherein the monitoring device has only one common conductor for transmission of said status signals and only two status signals are generated by each of said means for generating.

15. Monitoring device for a textile machine, said monitoring device comprising at least two stations (1*n*) each having a storage in which is stored an identification code associated to it in a fixed manner and means (2*n*) for generating during normal operation of said textile machine a first normal electrical status signal or a second status signal when a preselected abnormal state occurs, said second status signal being encoded with the identification code associated with this station; a common conductor over which said status signals of said at least two stations are transmitted; an electrical circuit coupled with said at least two stations in such a manner that said second status signals are automatically generated in said common conductor when said preselected abnormal state occurs; and an evaluation unit (8) being associated with said conductor, said evaluation unit having means for detecting the identification code such that the station generating the status signal can be identified therefrom, wherein said stations (1 . . . 1*n*) contain passive circuits ($IC_1$ . . . $IC_n$) wherein in the evaluating unit (8) is constructed as an interrogating and evaluating unit, has means (12) for generating an interrogating signal which can activate the passive circuits and has a transmitting and receiving coil arrangement (7,14), wherein said common conductor (4) is connected to an individual coupling coil (5) which is inductively coupled with the transmitting and receiving coil (7,14), and wherein at least one station has a parallel connection which is connected to the common conductor (4) and one of said passive circuits ($IC_1$ . . . $IC_n$) connected in parallel with the switch (2*a*▒2*n*); wherein the monitoring device has only one common conductor for transmission of said status signals and only two status signals are generated by each of said means for generating.

16. A knitting machine comprising a knitting machine part operating in a first normal state or in a second preselected abnormal state during operation of said machine; and a monitoring device including at least two stations (1*n*) each having a storage in which is stored an identification code associated to it in a fixed manner and means (2*n*) for generating a first electrical status signal during during the first normal state or a second status signal when the preselected abnormal state of the machine part occurs, said second status signal being encoded with the identification code associated with this station; a common conductor over which said status signals of said at least two stations are transmitted; an electrical circuit coupled with said generating means in such a manner that said second status signals are automatically generated in said common conductor when said preselected abnormal state occurs and an evaluation unit (8) associated with said common conductor for receiving the status signals appearing in said common conductor, said evaluation unit having means for detecting the identification code such that the station generating the status signal can be identified therefrom, wherein each of said stations has a switch (2*a* . . . 2*n*) for generating said status signals and a passive circuit ($IC_1$ . . . $IC_n$); and wherein means (5,7,14) are provided for coupling said common conductor (4) and said evaluating unit (8) in such a manner that said electrical circuit and said passive circuits are activated at the same time for transmitting said second encoded status signals whenever a preselected abnormal state occurs; wherein the monitoring device has only one common conductor for transmission of said status signals and only two status signals are generated by each of said means for generating.

17. Monitoring device for a textile machine, comprising at least two stations each having a storage in which an identification code associated to it is stored in a fixed manner, and each generating in a preselected state an electrical status signal which is encoded with the identification code associated with this station; a common transmission line for at least two of said at least two stations for transmitting the status signals of said stations; and an evaluating unit associated with said transmission line for receiving the status signals appearing in said transmission line, said evaluating unit having means for detecting the identification code such that the station generating the status signal can be identified therefrom, the stations (1*a* . . . 1*n*) are inductively coupled with the interrogating and evaluation unit (8), at least one stations has means (48) which normally prevents its inductive coupling with the interrogating and evaluating unit, produces the inductive coupling when an assigned state occurs, and accordingly enables a status signal to be transmitted.

18. Monitoring device according to claim 17, characterized in that the means (48) is a structural component part which can slide into the gap between two coils.

19. Monitoring device for a textile machine, comprising at least two stations each having a storage in which an identification code associated to it is stored in a fixed manner, and each generating in a preselected state an electrical status signal which is encoded with the identification code associated with this station; a common transmission line for at least two of said at least two stations for transmitting the status signals of said stations; and an evaluating unit associated with said transmission line for receiving the status signals appearing in said transmission line, said evaluating unit having means for detecting the identification code such that the station generating the status signal can be identified therefrom, the stations (1*a* . . . 1*n*) are inductively coupled with the interrogating and evaluating unit (8), the interrogating and evaluating unit (8) has a transmitting and receiving coil arrangement (7,14) and the stations (1*a* . . . 1*n*) are connected to at least one coupling coil (5) which is inductively coupled with the transmitting and receiving coil unit (7, 4), an individual coupling coil (5) is provided and is connected to a transmission line (4) which is connected with all stations (1*a* . . . 1*n*), at least one station has a series connect ion which is connected to the common conductor (4) and formed from switches (2*a* . . . 2*n*) and a passive circuit ($IC_1$ . . . $IC_n$) connected with this switch (2*a* . . . 2*n*).

20. Monitoring device for a textile machine, comprising at least two stations each having a storage in which an identification code associated to it is stored in a fixed manner, and each generating in a preselected state an electrical status signal which is encoded with the identification code associated with this station; a common transmission line for at least two of said at least two stations for transmitting the status signals of said stations; and an evaluating unit associated with said transmission line for receiving the status signals appearing in said transmission line, said evaluating unit having means for detecting the identification code such that the station generating the status signal can be identified therefrom, the stations (1*a* . . . 1*n*) are inductively coupled with the interrogating and evaluating unit (8), that the interrogating and evaluating unit (8) has a transmitting and receiving coil arrangement (7,14) and the stations (1*a* . . . 1*n*) are connected to at least one coupling coil (5) which is inductively coupled with the transmitting and receiving coil unit (7,14), an individual coupling coil (5) is provided and is connected to a common conductor (4) which is connected with all stations (1*a* . . . 1*n*), at least one station has a passive circuit ($IC_1$ . . . $IC_n$) with a first coil (17*a* . . . 17*n*) and a second coil (16*a* . . . 16*n*) which is inductively coupled with the latter and, together with a switch (2*a* . . . 2*n*), forms a series connection connected to the common conductor (4).

21. Monitoring device for a textile machine, comprising at least two stations each having a storage in which an identification code associated to it is stored in a fixed manner, and each generating in a preselected state an electrical status signal which is encoded with the identification code associated with this station; a common transmission line for at least two of said at least two stations for transmitting the status signals of said stations; and an evaluating unit associated with said transmission line for receiving the status signals appearing in said transmission line, said evaluating unit having means for detecting the identification code such that the station generating the status signal can be identified therefrom, the stations (1*a* . . . 1*n*) are inductively coupled with the interrogating and evaluating unit 8, the interrogating and evaluating unit (8) has a transmitting and receiving coil arrangement (7,14) and the stations (1*a* . . . 1*n*) are connected to at least one coupling coil (5) which is inductively coupled with the transmitting and receiving coil unit (7,14), an individual coupling coil (5) is provided and is connected to a common conductor (4) which is connected with all stations (1*a* . . . 1*n*), a circuit with two additional coils, one of which is inductively coupled with the transmitting and receiving coil arrangement (7,14) while the other is inductively coupled with the coupling coil, is connected between the transmitting and receiving coil arrangement (7,14) and the coupling coil (5).

22. Monitoring device for a textile machine, comprising at least two stations each having a storage in which an identification code associated to it is stored in a fixed manner, and each generating in a preselected state an electrical status signal which is encoded with the identification code associated with this station; a common transmission line for at least two of said at least two stations for transmitting the status signals of said stations; and an evaluating unit associated with said transmission line for receiving the status signals appearing in said transmission line, said evaluating unit having means for detecting the identification code such that the station generating the status signal can be identified therefrom, the stations (1*a* . . . 1*n*) are inductively coupled with the interrogating and evaluating unit (8), the interrogating and evaluating unit (8) has a transmitting and receiving coil arrangement (7,14) and the stations (1*a* . . . 1*n*) are connected to at least one coupling coil (5) which is inductively coupled with the transmitting and receiving coil unit (7,14), an individual coupling coil (5) is provided and is connected to a common conductor (4) which is connected with all stations (1*a* . . . 1*n*), at least one station (1*a* . . . 1*n*) has a passive circuit ($IC_1$ . . . $IC_n$) with a switch ($2a_1 \ldots 2_{1m}$) and a first coil (20*a* . . . 20*m*) which is inductively coupled with a second coil (19*a* . . . 19*n*) connected to the transmission line (18).

23. Monitoring device for a textile machine, comprising at least two stations each having a storage in which an identification code associated to it is stored in a fixed manner, and each generating in a preselected state an electrical status signal which is encoded with the identification code associated with this station; a common transmission line for at least two of said at least two stations for transmitting the status signals of said stations; and an evaluating unit associated with said transmission line for receiving the status signals appearing in said transmission line, said evaluating unit having means for detecting the identification code such that the station generating the status signal can be identified therefrom, the stations (1*a* . . . 1*n*) are inductively coupled with the interrogating and evaluating unit (8), the interrogating and evaluating unit (8) has a transmitting and receiving coil arrangement (7,14) and the stations (1*a* . . . 1*n*) are connected to at least one coupling coil (5) which is inductively coupled with the transmitting and receiving coil unit (7,14), an individual coupling coil (5) is provided and is connected to a common conductor (4) which is connected with all stations (1*a* . . . 1*n*), a plurality of coils (19*a* . . . 19*n*), each of which is associated with a textile machine ($TM_1$ . . . $TM_n$), are connected in the transmission line (18) and every coil (19*a* . . . 19*n*) is inductively coupled with at least one station.

24. Monitoring device for a textile machine, comprising at least two stations each having a storage in which an identification code associated to it is stored in a fixed manner, and each generating in a preselected state an electrical status signal which is encoded with the identification code associated with this station; a common transmission line for at least two of said at least two stations for transmitting the status signals of said stations; and an evaluating unit associated with said transmission line for receiving the status signals appearing in said transmission line, said evaluating unit having means for detecting the identification code such that the station generating the status signal can be identified therefrom, the stations (1*a* . . . 1*n*) are inductively coupled with the interrogating and evaluating unit (8), the interrogating and evaluating unit (8) has a transmitting and receiving coil arrangement (7,14) and the stations (1*a* . . . 1*n*) are connected to at least one coupling coil (5) which is inductively coupled with the transmitting and receiving coil unit (7,14), an individual coupling coil (5) is provided and is connected to a common conductor (4) which is connected with all stations (1*a* . . . 1*n*), a plurality of coupling coils (5*a* . . . 5*n*) are coupled with the transmitting and receiving coil arrangement (7,14) and every coupling coil (5*a* . . . 5*n*) is connected with at least one station which has a passive circuit ($IC_1$ . . . $IC_n$) and a switch (2*a* . . . 2*n*).

25. Monitoring device for a textile machine, said monitoring device comprising at least two stations (1*n*) each having a storage in which is stored an identification code associated to it in a fixed manner and means (2*n*) for generating a first electrical status signal during normal operation of said machine or a second status signal when a preselected abnormal state occurs, said second status signal being encoded with the identification code associated with this station; a common conductor over which said status signals of said at least two stations are transmitted; an electrical circuit coupled with said means of said at least two stations in such a manner that said second status signals are automatically generated in said common conductor when said preselected abnormal state occurs and an evaluation unit associated with said common conductor for receiving the status signals appearing in said common conductor, said evaluation unit having means for detecting the identification code such that the station generating the status signal can be identified therefrom, the stations being inductively coupled with the evaluation unit; wherein the monitoring device has only one common conductor for transmission of said status signals and only two status signals are generated by each of said means for generating.

* * * * *